United States Patent
Arant et al.

(10) Patent No.: US 9,840,171 B2
(45) Date of Patent: Dec. 12, 2017

(54) ADJUSTABLE FIRMNESS VEHICLE SEAT

(71) Applicant: Ford Global Technologies, LLC, Dearborn, MI (US)

(72) Inventors: Michael Paul Arant, Fenton, MI (US); Jeroen Lem, Maastricht (NL); Steve Michell, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/926,611

(22) Filed: Oct. 29, 2015

(65) Prior Publication Data
US 2016/0046207 A1 Feb. 18, 2016

Related U.S. Application Data

(63) Continuation of application No. 13/460,318, filed on Apr. 30, 2012, now Pat. No. 9,211,824.

(51) Int. Cl.
| | |
|---|---|
| *B60N 2/44* | (2006.01) |
| *A47C 7/46* | (2006.01) |
| *B60N 2/70* | (2006.01) |
| *B60N 2/66* | (2006.01) |
| *B60N 2/62* | (2006.01) |

(Continued)

(52) U.S. Cl.
CPC ......... *B60N 2/4415* (2013.01); *B60N 2/0232* (2013.01); *B60N 2/0244* (2013.01); *B60N 2/62* (2013.01); *B60N 2/66* (2013.01); *B60N 2/665* (2015.04); *B60N 2/7082* (2013.01); *B60N 2/72* (2013.01); *A47C 7/467* (2013.01); *B60N 2002/024* (2013.01); *B60N 2002/0268* (2013.01)

(58) Field of Classification Search
CPC .... B60N 2/0244; B60N 2/4415; B60N 2/665; B60N 2/7082; B60N 2/7088; B60N 2/66; B60N 2/62; B60N 2002/0268; A47C 4/54; A47C 7/467
USPC ........... 297/452.41, 199, 200, DIG. 8, 284.6; 5/655.3
See application file for complete search history.

(56) References Cited

U.S. PATENT DOCUMENTS

| | | | | |
|---|---|---|---|---|
| 2,938,570 | A | * | 5/1960 | Flajole ................. A47C 27/081 137/861 |
| 3,330,598 | A | | 7/1967 | Whiteside |
| 3,915,421 | A | | 10/1975 | Le Forestier |

(Continued)

FOREIGN PATENT DOCUMENTS

| | | | | |
|---|---|---|---|---|
| AT | EP 1935290 A1 | * | 6/2008 | ............... A47C 4/54 |
| DE | 3119867 A1 | | 12/1982 | |

(Continued)

*Primary Examiner* — Milton Nelson, Jr.
(74) *Attorney, Agent, or Firm* — Vichit Chea; Price Heneveld LLP

(57) ABSTRACT

A vehicle seat is provided herein. The vehicle seat includes a cushion disposed within a seating member having at least one inflatable first bladder for selectively adjusting the firmness of the cushion. An inflatable second bladder is separated from a support surface of the seating member by the first bladder and fluidly connected to the first bladder. A vehicle seat hip pivot point is maintained when adjusting the firmness of the cushion by increasing the pressure in the second bladder when the pressure in the first bladder is selectively decreased, and by decreasing the pressure in the second bladder when the pressure in the first bladder is selectively increased.

14 Claims, 11 Drawing Sheets

(51) Int. Cl.
*B60N 2/72* (2006.01)
*B60N 2/02* (2006.01)

(56) References Cited

U.S. PATENT DOCUMENTS

| | | | |
|---|---|---|---|
| 3,984,886 A * | 10/1976 | Keeton | A47C 4/54 |
| | | | 297/284.3 |
| 5,020,852 A | 6/1991 | Marion | |
| 5,082,326 A | 1/1992 | Sekido et al. | |
| 5,190,348 A | 3/1993 | Colasanti | |
| 5,263,765 A | 11/1993 | Nagashima et al. | |
| 5,318,344 A | 6/1994 | Wang | |
| 5,860,699 A | 1/1999 | Weeks | |
| 6,203,105 B1 | 3/2001 | Rhodes, Jr. | |
| 7,322,651 B2 | 1/2008 | Makhsous et al. | |
| 8,794,707 B2 | 8/2014 | Bocsanyi et al. | |
| 2005/0242644 A1* | 11/2005 | Bauer | B60N 2/448 |
| | | | 297/284.3 |
| 2010/0117414 A1 | 5/2010 | Hwang et al. | |
| 2011/0227388 A1* | 9/2011 | Bocsanyi | B60N 2/665 |
| | | | 297/452.41 |

FOREIGN PATENT DOCUMENTS

| | | | |
|---|---|---|---|
| DE | 3735428 A1 | 10/1987 | |
| DE | 102012209449 A1 * | 12/2013 | A47C 4/54 |
| NO | WO 2007105959 A1 * | 9/2007 | A47C 7/467 |

\* cited by examiner

ADJUSTABLE FIRMNESS VEHICLE SEAT

CROSS-REFERENCE TO RELATED APPLICATION

This patent application is a continuation of U.S. Pat. No. 9,211,824, which was issued on Dec. 15, 2015, entitled "ADJUSTABLE FIRMNESS VEHICLE SEAT." The aforementioned related application is hereby incorporated by reference in its entirety.

FIELD OF THE INVENTION

The present invention generally relates to a vehicle seat, and more particularly to a vehicle seat having inflatable air bladders for adjusting the firmness of a seat cushion.

BACKGROUND OF THE INVENTION

Modern vehicles are often equipped with adjustable support in both the seat and seat back. In a vehicle coordinate system, there is defined a hip pivot point, commonly referred to in the automotive industry as the "h-point." The h-point is defined by the hip joint, which is the pivot point between the torso and the upper leg portions of the body. In vehicle design, the h-point is the point which determines the position of the vehicle occupant in the vehicle coordinate system when he or she is seated on the vehicle seat. The h-point and any seat adjustment apparatus must be taken into consideration when designing the vehicle seat, as well as many other interior components.

SUMMARY OF THE INVENTION

According to one aspect of the present disclosure, a vehicle seat is disclosed. The vehicle seat includes a cushion disposed within a seating member having at least one inflatable first bladder for selectively adjusting a firmness of the cushion. An inflatable second bladder is separated from a support surface of the seating member by the first bladder and is fluidly connected to the first bladder. A vehicle seat hip pivot point is maintained when adjusting the firmness of the cushion by increasing the pressure in the second bladder when the pressure in the first bladder is selectively decreased, and by decreasing the pressure in the second bladder when a pressure in the first bladder is selectively increased.

According to another aspect of the present disclosure, a vehicle seat is disclosed. The vehicle seat includes a cushion coupled to a seating member having an inflatable first air bladder. An inflatable second air bladder is positioned adjacent the first air bladder. A hose and control valve is coupled to the first and second air bladders and is configured to maintain a vehicle seat hip pivot point by counteracting a change in air pressure within the first air bladder with an inverse change in pressure within the second air bladder.

According to yet another aspect of the present disclosure, a seat assembly is disclosed. The seat assembly includes a seating member having a cushion disposed therein. The cushion includes an inflatable first air bladder for selectively adjusting a firmness of the cushion. An adjustment mechanism is coupled to the air bladder. The adjustment mechanism adjusts a distance between the air bladder and a support surface of the seating member as an air pressure of the air bladder is adjusted to maintain a constant hip pivot point.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
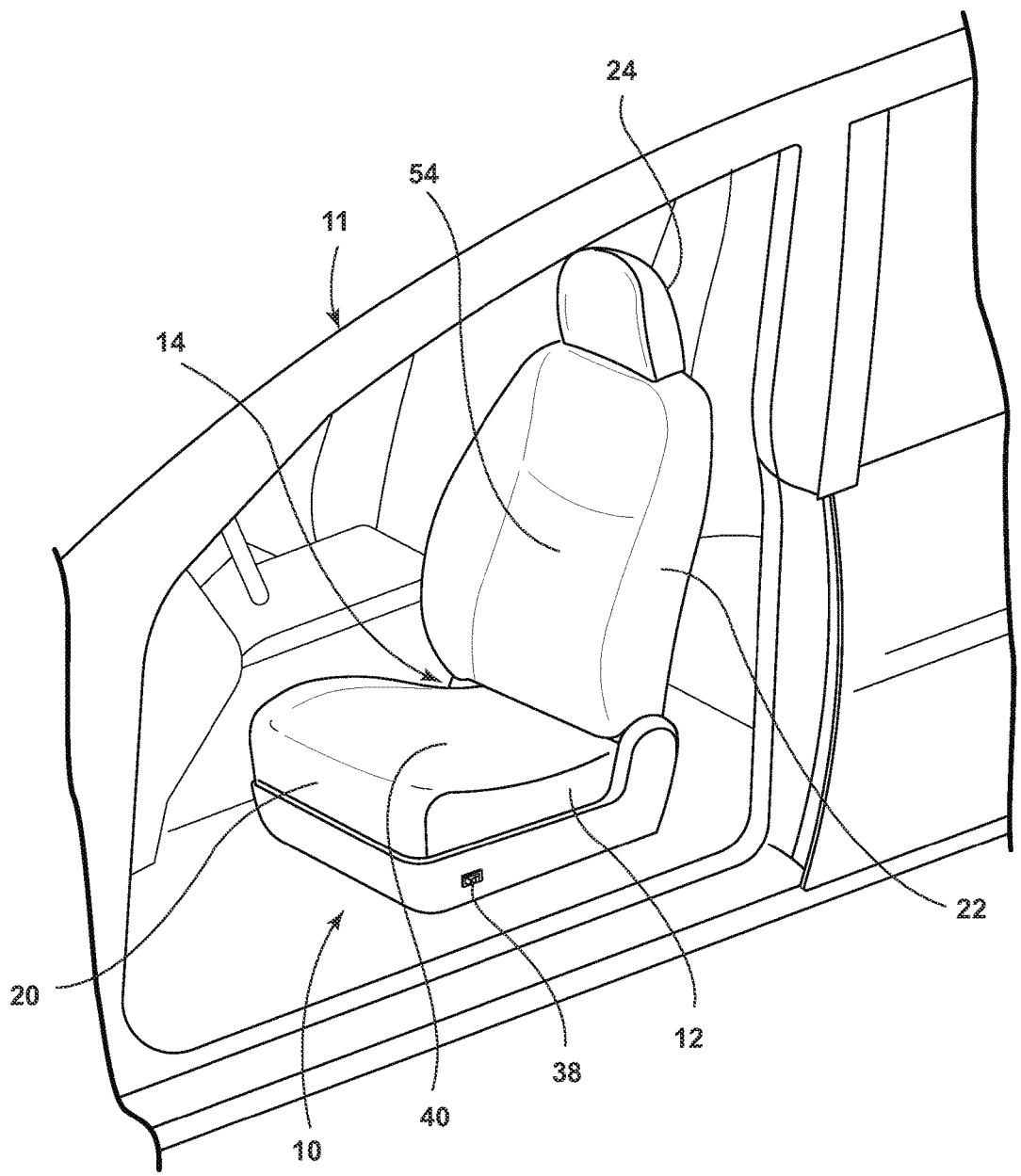
FIG. 1 is a top perspective view of a vehicle seat disposed inside a vehicle.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, reference numeral 10 generally designates a seat assembly for an automotive vehicle 11. The vehicle seat 10 includes a cushion 12 coupled to a seating member 14, and the cushion 12 has an inflatable first bladder 16 for selectively adjusting the firmness of the cushion 12. The vehicle seat 10 includes an inflatable second bladder 18, which is positioned adjacent the first bladder 16. A vehicle seat hip pivot point HP, commonly referred to in the automotive industry as an "h-point", is maintained by counteracting a change in pressure within the first bladder 16 with an inverse change in pressure within the second bladder 18.

Figure 10:
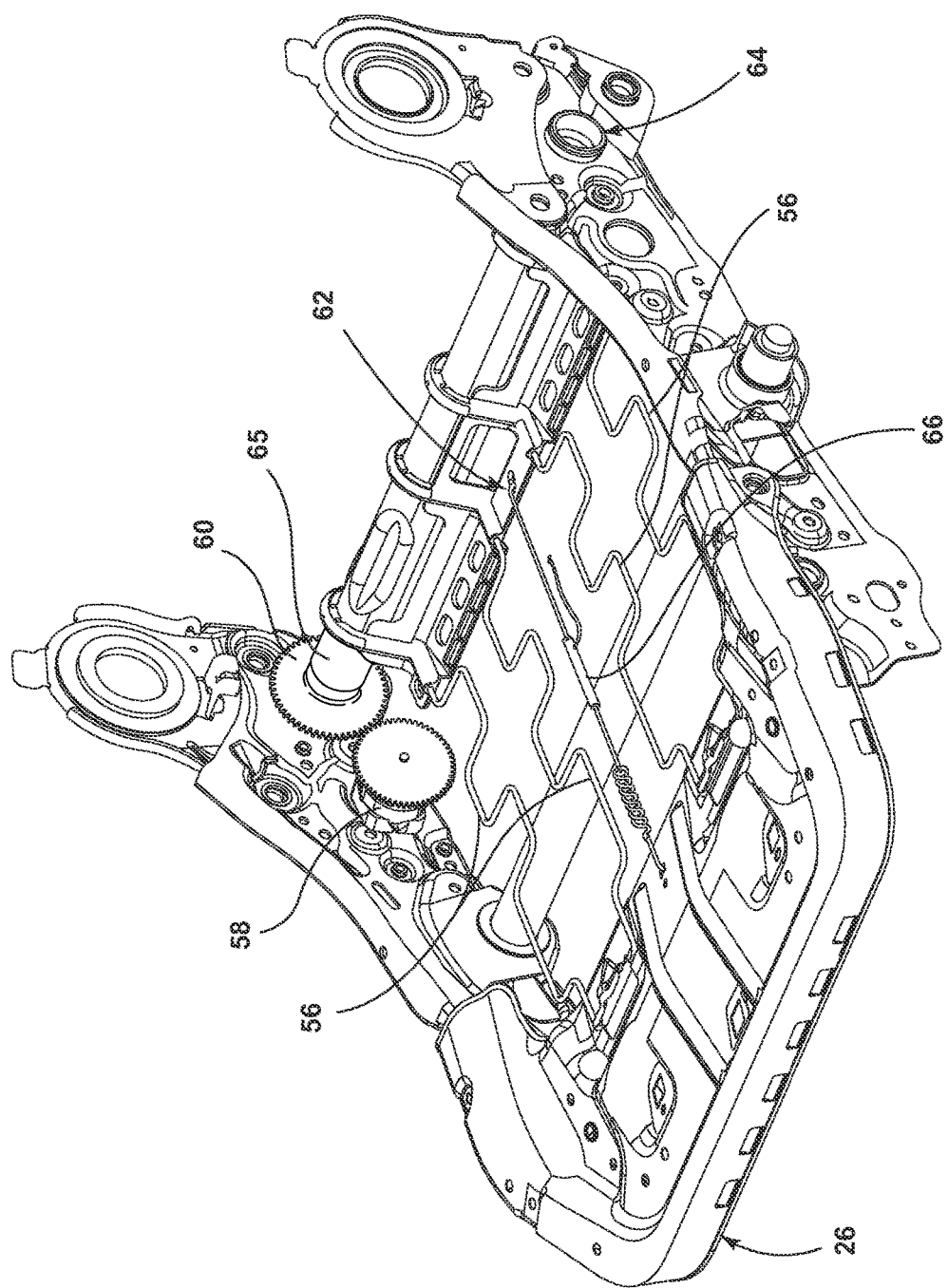
FIG. 10 is a top perspective view of a lower seat frame of the vehicle seat of FIG. 7, illustrating one embodiment of a height adjustment mechanism.
Figure 11:
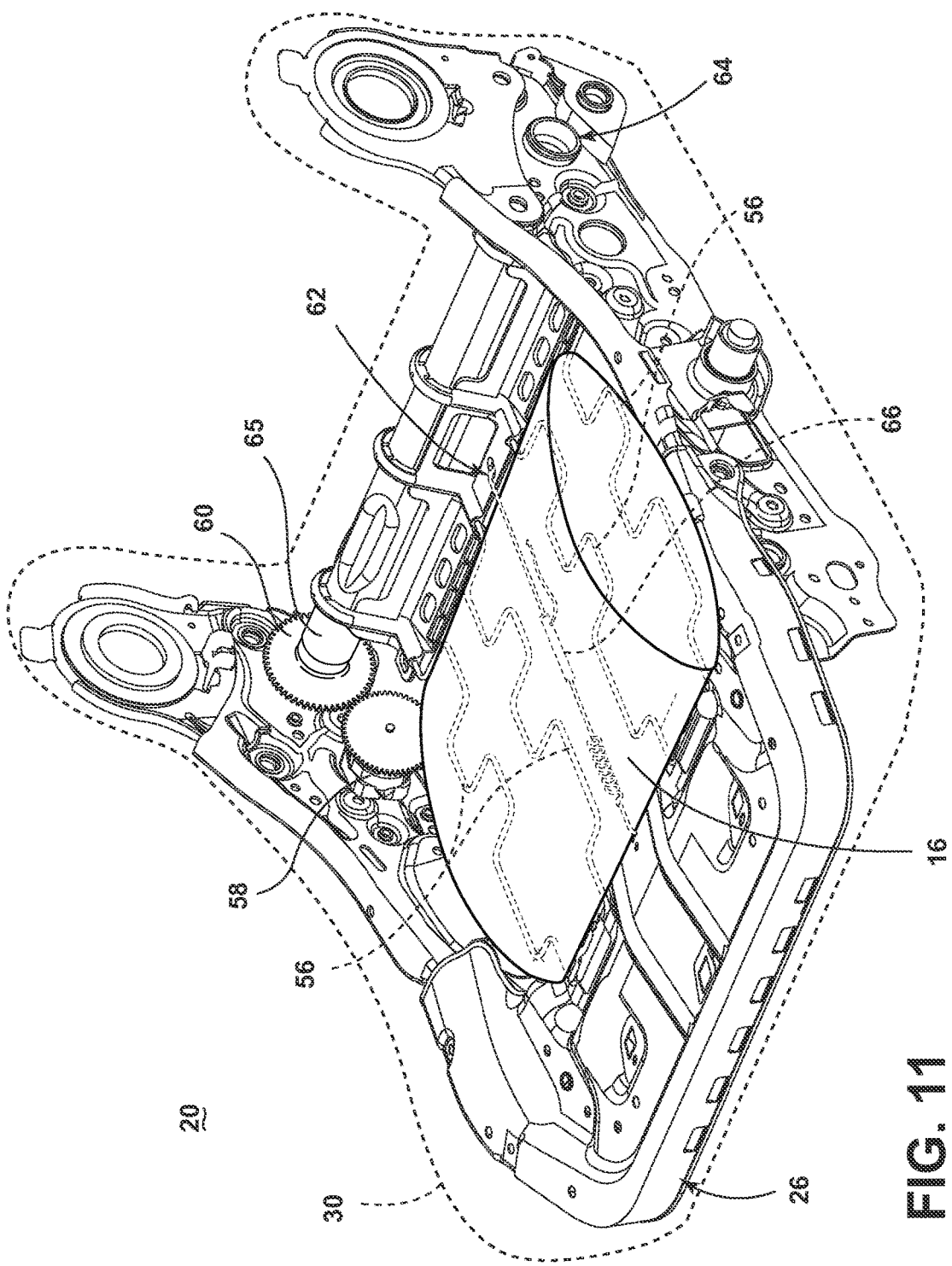
FIG. 11 is a top perspective view of the lower seat frame and height adjustment mechanism of FIG. 10, including an adjustable bladder.
Figure 12:
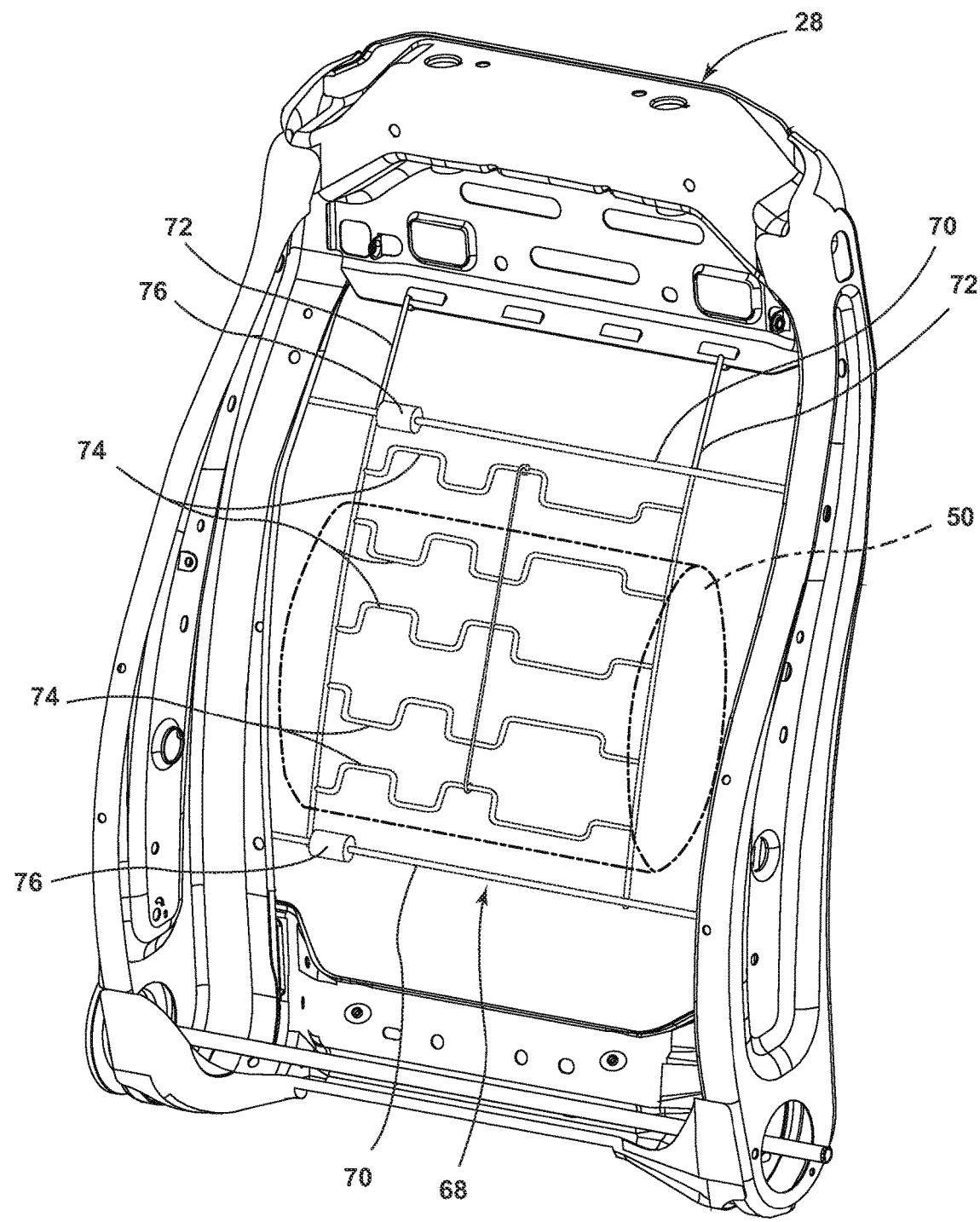
FIG. 12 is a bottom perspective view of an upper seat frame of the vehicle seat of FIG. 7, illustrating one embodiment of a back support assembly and adjustable bladder.

As shown in FIG. 1, the vehicle seat 10 is generally configured for use in a variety of vehicles 11 in either a front driver seat, a front passenger seat, or a rear seat of the vehicle 11 and generally includes seating member 14, illustrated in the form of a seat 20 and a seat back 22, each of which have a cushion 12a, 12b, respectively. A headrest 24 is also mounted to the top of the seat back 22. The vehicle seat 10 also includes a seat frame formed by lower seat frame 26 (FIG. 10) and upper seat frame 28 (FIG. 12) and may be configured to be mounted on a support surface, such as a floor pan of the vehicle 11. A track assembly may be coupled to the seat 20 to facilitate fore and aft positioning of the vehicle seat 10. The vehicle seat 10 is generally designed for the comfort of an occupant, as well as to accommodate and protect the occupant during a collision event.

Figure 2:
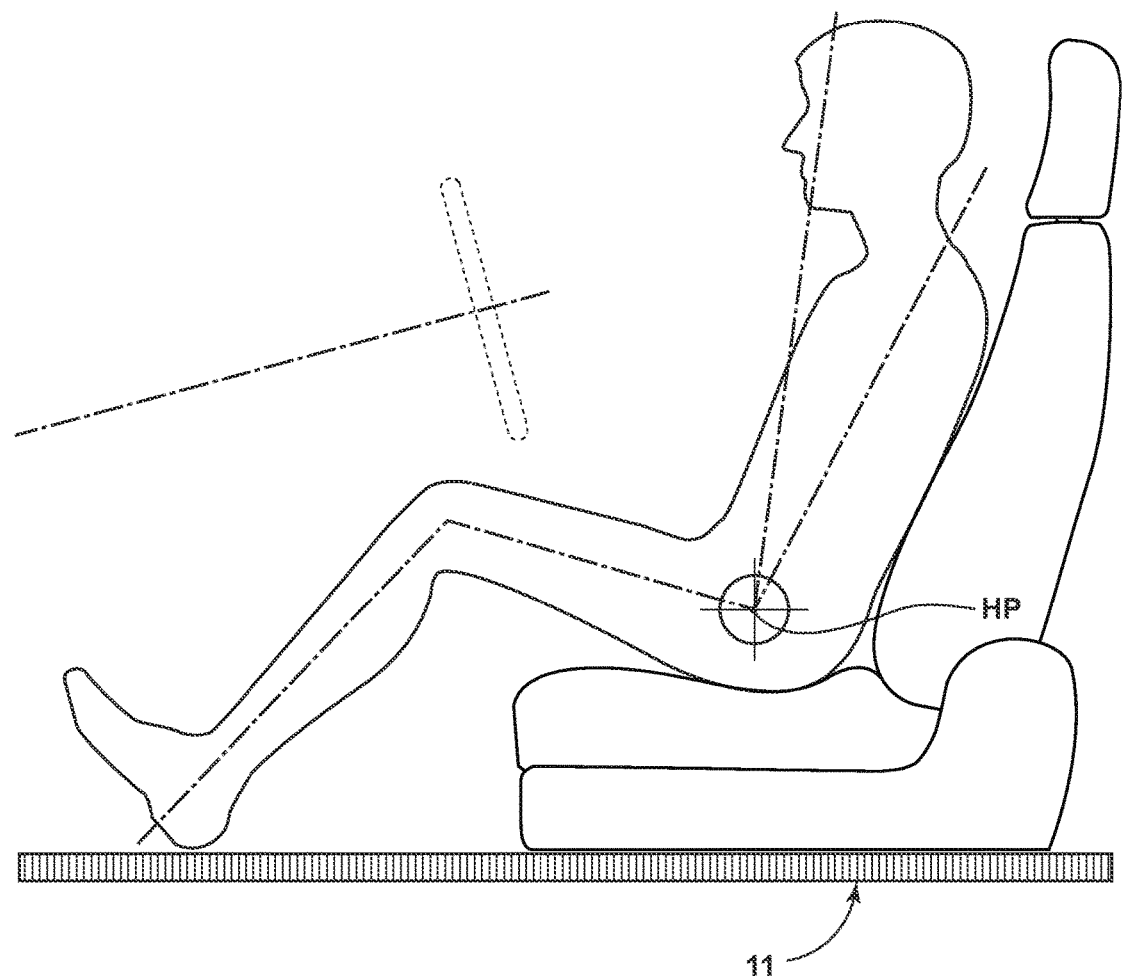
FIG. 2 is schematic side view of a vehicle occupant, illustrating the hip pivot point of the occupant when seated in the vehicle.

Referring now to FIG. 2, the vehicle hip pivot point, referred to as h-point HP, is the location of the occupant's hip, when seated in the vehicle seat 10, relative to the floor pan of the vehicle 11 (or to the height above the pavement level). The h-point HP as generally defined by the Society of Automotive Engineers (SAE) is a mechanically hinged hip point of a three-dimensional manikin (SAE J2826 manikin), which simulates the actual pivot center of a human hip. The h-point HP can be thought of, roughly, as the hip joint of a $50^{th}$ percentile male occupant, viewed laterally. Additionally, the h-point HP location is unique to each vehicle 11 and many design criteria related to various vehicle aspects such as safety, interior packaging, visibility, and seating are based off of the h-point HP location.

Figure 3:
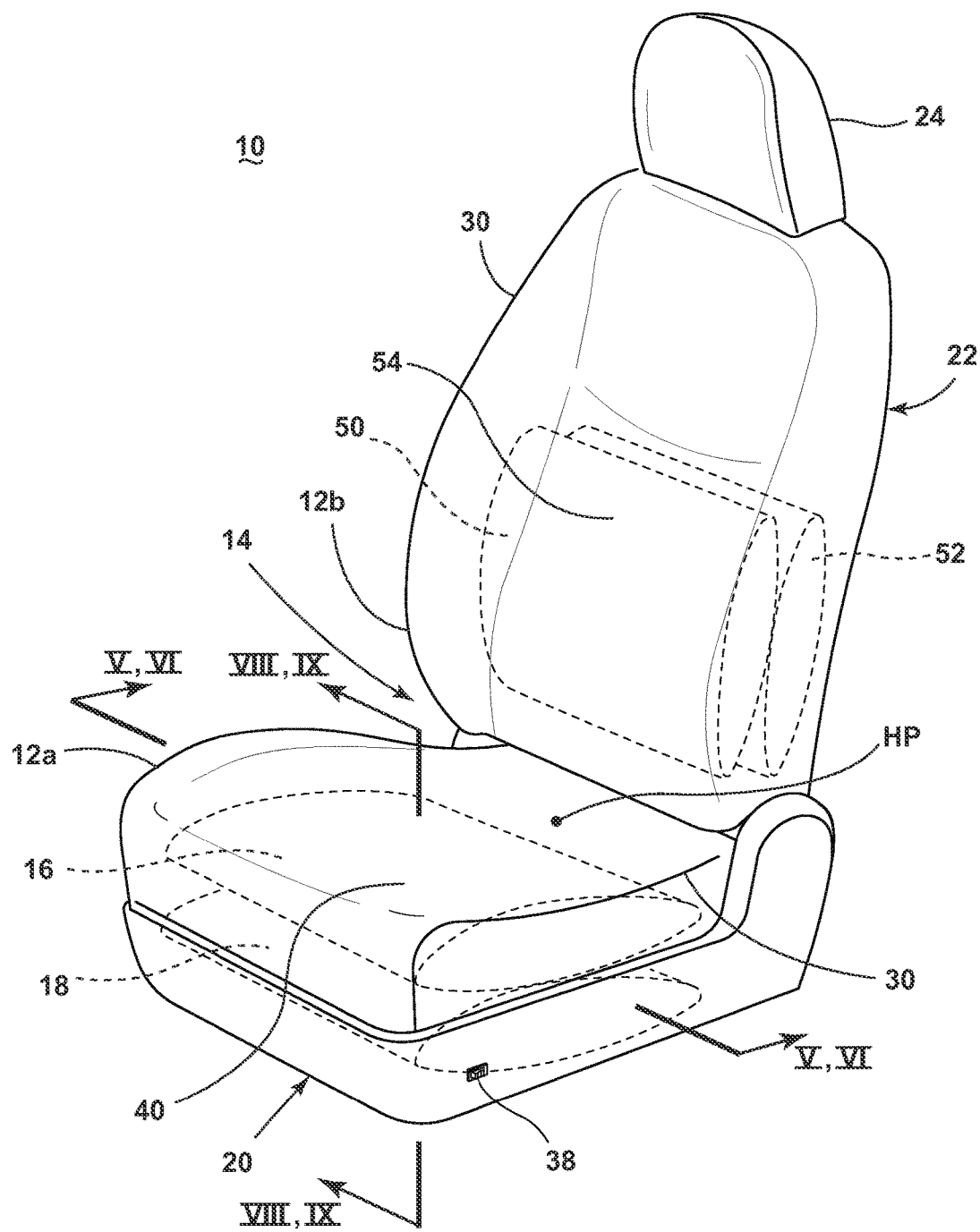
FIG. 3 is a top perspective view of the vehicle seat, according to one embodiment of the invention.
Figure 4:
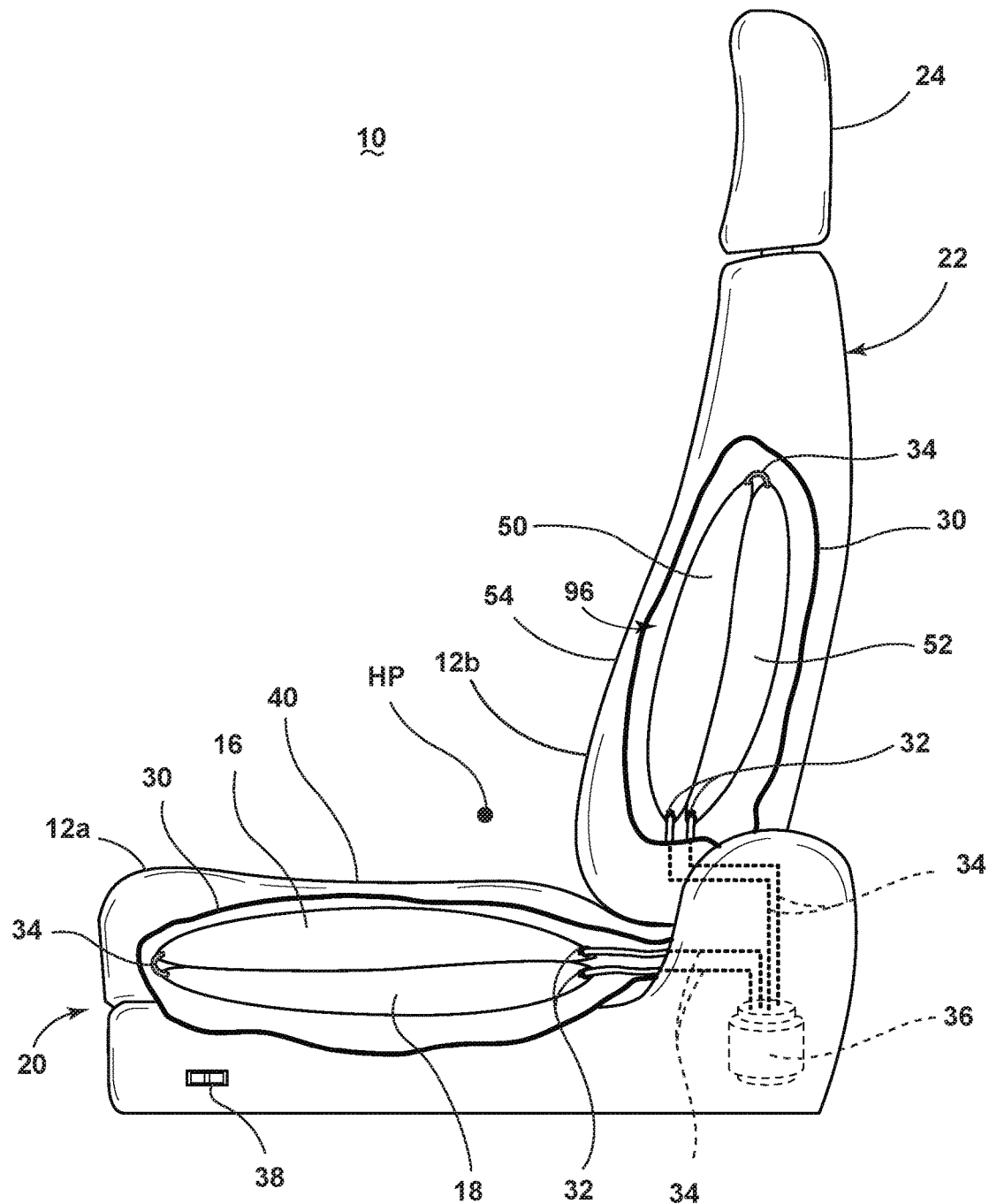
FIG. 4 is a side elevational view of the vehicle seat of FIG. 3 with portions of the seat cut-away to illustrate the components within the vehicle seat.

Referring now to FIGS. 3-4, the seat 20 is configured to support the occupant's buttocks and upper thighs upon the seat cushion 12a, the firmness of which is configured to be selectively adjustable. The cushion 12a includes, in part, the first and second bladders 16, 18, and a trim cover 30. The trim cover 30 is coupled to the seat 20 and/or the lower seat frame 26 (FIG. 10) and covers the cushion 12a in an aesthetically pleasing manner. The first and second bladders 16, 18 are enclosed within the trim cover 30 and are arranged in a substantially stacked relationship where the first bladder 16 is positioned above the second bladder 18 and below the trim cover 30, with respect to the floor pan of the vehicle 11. Optionally, a thin layer of foam 96 may be included between the first bladder 16 and the trim cover 30 and/or the trim cover 30 may be foam backed. Additionally, a thin layer of foam or other material may be included between the first and second bladders 16, 18. In one embodiment, the first and second bladders 16, 18 are made of a deformable elastomeric material, such as thermoplastic polyurethane, but can also be made from other suitable deformable material as commonly known in the art. The trim cover 30 may be made of any suitable material commonly known in the art, for example, cloth, leather, or polymers. Additionally, the first and second bladders 16, 18 may be substantially similar in terms of functionality; however the geometric shape of the two bladders 16, 18 need not necessarily be the same. Stated differently, the first and second bladders 16, 18 may be similar in material and the ability to inflate/deflate, but are not necessarily equivalent in size and shape.

The first and second bladders 16, 18 are provided with inlets 32, which are fluidly coupled to lines or hoses 34 and a pump 36 for inflating and deflating the bladders 16, 18. Additionally, both the first and second bladders 16, 18 may be operably coupled to a pump controller, multiple control valves, and a switch 38 for selectively activating the pump 36. The switch 38 may be a multi-position switch and can be mounted in a convenient and reachable location, such as a seat side shield or an instrument panel, so the occupant can control the inflation and deflation of the bladders 16, 18. Additionally, the switch 38 may be capacitive and included in the vehicle software, and may be accessible through a touch screen included in the instrument panel or other location. The pump 36 is a conventional pump and pumps either ambient air or a fluid through the valves to the bladders 16, 18. When activated, the pump 36 inflates the bladders 16, 18. Although not shown, the bladders 16, 18 may also include exhaust ports, which, when activated by the switch 38, are opened to deflate the bladders 16, 18. Further, it is within the scope of the present disclosure to use any suitable inflation system to inflate and deflate the bladders 16, 18. It should be noted that the terms "inflation" and "deflation" are used interchangeably herein with the phrases "increase in pressure" and "decrease in pressure."

The firmness of the cushion 12a and therefore the seat 20 itself, can be adjusted by increasing or decreasing the pressure within the first bladder 16. In one embodiment, the bladders 16, 18 are air bladders and the inflation system uses air to inflate/deflate the bladders 16, 18. As is easily understood, increasing the air pressure within the first bladder 16 increases the firmness of the cushion 12a, and decreasing the air pressure within the first bladder 16 decreases the firmness of the cushion 12a. As the first bladder 16 is inflated, it expands upward, thereby raising, in terms of height relative to the vehicle floor pan, a seating surface 40 of the cushion 12a. The increased firmness and subsequent rise of the seating surface 40 moves the location of the h-point HP. The opposite is true for decreasing the firmness of the cushion 12a.

According to one embodiment, the second bladder 18 can be utilized to counteract a change in the height of the seating surface 40 caused by an increase or decrease in the pressure within the first bladder 16. The first and second bladders 16, 18 are stacked, therefore a change in pressure within either or both of the bladders 16, 18 may raise or lower the seating surface 40. Additionally, the pump controller can be programmed to automatically adjust the pressure within the second bladder 18 a predetermined and proportionate amount in response to the change in pressure within the first bladder 16.

Figure 6:
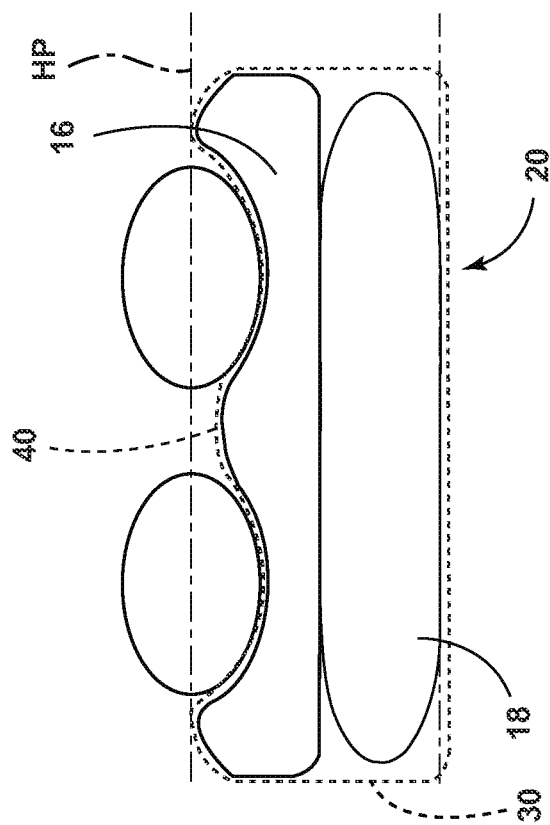
FIG. 6 is a schematic, front cross-sectional view taken along line VI-VI of the vehicle seat of FIG. 3, illustrating an occupants legs seated on a soft seating surface.
Figure 5:
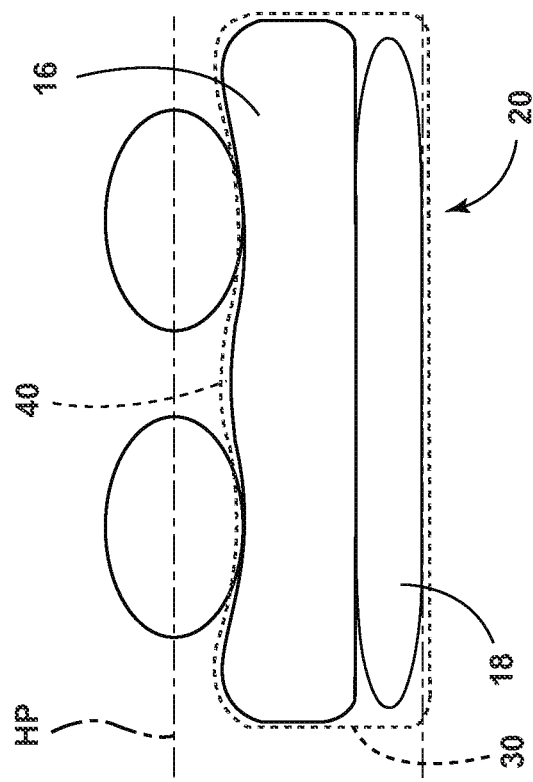
FIG. 5 is a schematic, front cross-sectional view taken along line V-V of the vehicle seat of FIG. 3, illustrating an occupant's legs seated on a firm seating surface.
Figure 7:
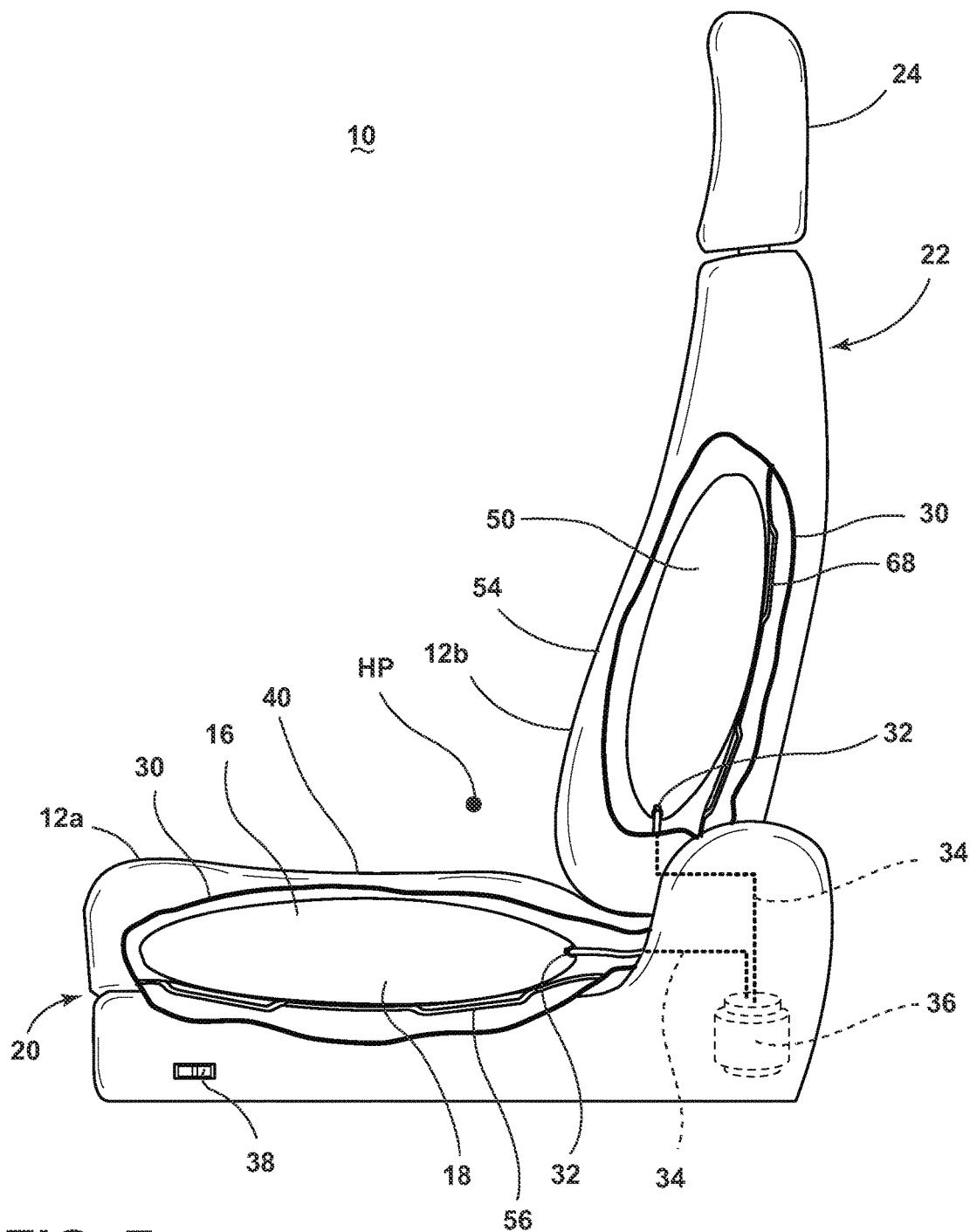
FIG. 7 is a side elevational view of a vehicle seat, according to another embodiment of the invention, with portions of the seat cut-away to illustrate the components within the vehicle seat

In operation, and as illustrated in FIGS. 5-6, an occupant may selectively change the firmness of the vehicle seat 10. As shown in FIG. 6, when the occupant of the seat 10 wishes to decrease the support provided by the seat cushion 12a, the occupant can move the switch 38 (FIG. 3) to selectively deflate the upper first bladder 16, allowing the occupant's body to sink into the cushion 12a to a greater degree. This effectively softens the cushion 12a by softening the first bladder 16 and more evenly distributing the occupant's body load on the cushion 12a. Deflating the first bladder 16 decreases the height of the first bladder 16, and therefore lowers the seating surface 40 and the location of the h-point HP. However, the decrease in height of the first bladder 16 can be compensated for by increasing the height of the lower second bladder 18 by automatically inflating the second bladder 18. Stated differently, an increase in the height of the second bladder 18 compensates for the decrease in height of the first bladder 16. This enables the occupant to select a softer seat cushion 12a, yet maintain the overall height of the seating surface 40 and relative location of the h-point HP. As is easily understood, the opposite is true with respect to increasing the firmness of the cushion 12a. Referring to FIG. 5, when increasing the firmness of the cushion 12a, the first bladder 16 is selectively inflated, and the second bladder 18 is automatically deflated.

Additionally, the seat back 22 is configured to support the occupant's back upon the seat back cushion 12b, the firmness of which is configured to be selectively adjustable. Referring back to FIG. 4, the seat back cushion 12b may also have similar first and second bladders 50, 52 covered by the trim cover 30. The first and second bladders 50, 52 are disposed within the trim cover 30 and are arranged in a substantially vertical fore/aft relationship where the second bladder 52 is positioned rearward of the first bladder 50. When the first bladder 50 is inflated, it expands forward, moving a support surface 54 of the cushion 12b forward. This does not affect the height of the seating surface 40 of the seat 20, but it does move the location of the h-point HP. The opposite is true for decreasing the firmness of the cushion 12b.

The second bladder 52 can be utilized to counteract a change in the position of seat back cushion 12b caused by an increase or decrease in the pressure within the first bladder 50. For example, to obtain a softer seat back cushion 12b, the occupant can selectively deflate the first bladder 50, allowing the occupant's back to sink into the cushion 12b to a greater degree. Deflating the first bladder 50 decreases the thickness of the first bladder 50, and therefore also moves the location of the h-point HP rearward in the vehicle 11. The decrease in the thickness of the first bladder 50 can be compensated for by increasing the thickness of the second bladder 52 by automatically inflating the second bladder 52. The increase in the thickness of the second bladder 52 compensates for the decrease in thickness of the first bladder 50. This enables the occupant to select a softer seat back cushion 12b, yet maintain the location of the h-point HP. As is easily understood, the opposite is true with respect to increasing the firmness of the cushion 12b. When increasing the firmness of the cushion 12b, the first bladder 50 is selectively inflated, and the second bladder 52 is automatically deflated.

In another embodiment, the above described bladders 16, 18, 50, 52 are liquid bladders and the inflation system uses liquid to inflate/deflate the bladders 16, 18, 50, 52. Additionally, the bladders 16, 18, 50, 52 may each be made up of a plurality of bladders. It is contemplated that the plurality of bladders that make up each of the bladders 16, 18, 50, 52 can be fluidly communicative via additional lines or hoses. Further, the bladders 16, 18 and bladders 50, 52 can be fluidly connected to one another by hoses 34. Control valves can be utilized to allow the air or fluid to flow freely through all the connected bladders 16, 18, 50, 52 when an occupant is seated in the vehicle seat 10, allowing the bladders 16, 18, 50, 52 to equalize in pressure and firmness. The pump controller may then automatically adjust the h-point HP based on the occupant's weight and a predetermined and pre-programmed baseline firmness. After this initial equalization, the occupant may selectively adjust the firmness of the cushions 12a, 12b, and the pump controller will inflate or deflate the bladders 16, 18, 50, 52 accordingly. It is also contemplated that a pressure sensor or one of the bladders 16, 18, 50, and 52 may be used to sense the presence of a seated occupant, as is generally understood by one having skill in the art.

In yet another embodiment, the second bladder 18 is replaced with a height adjustment mechanism that is adapted to adjust the height, relative to the floor pan of the vehicle 11, of the first bladder 16. Referring to the illustrated example in FIGS. 7-11, the height adjustment mechanism is in the form of at least one variable tension spring 56 mounted to the lower seat frame 26 and positioned below the first bladder 16. The height adjustment mechanism also includes a motor 58, a gear 60, and a spring attachment member 62. A fixedly mounted connecting rod 64 extends between lateral sides of the seat 20 and a sleeve 65 rotatably encircles the connecting rod 64. The motor 58 and gear 60 are operably coupled to the sleeve 65 and the spring attachment member 62 is rigidly mounted on the sleeve 65. The variable tension springs 56 are mounted in tension between the spring attachment member 62 and a forward portion of the lower seat frame 26. When activated, the motor 58 and gear 60 are adapted to rotate the sleeve 65 and spring attachment member 62. In the illustrated example, rotating the sleeve 65 and spring attachment member 62 rearward raises a rear portion of the variable tension springs 56 and increases the tension applied thereto. Raising the rear portion of the variable tension springs 56 raises the height of the seating surface 40. Additionally, as is understood by one of ordinary skill in the art, increasing the tension on the variable tension springs 56 decreases the flex or extension thereof, which means the springs 56 and adjacent first bladder 16 will move downward a smaller distance when placed under load, such as when an occupant sits on the seat 20. Conversely, rotating the sleeve 65 and spring attachment member 62 forward lowers the rear portion of the variable tension springs 56 and decreases the tension applied to the variable tension springs 56. This increases the flex or extension of the variable tension springs 56, which means the springs 56 and adjacent first bladder 16 will move downward a greater distance when an occupant is seated in the seat 20. Further, lowering the rear portion of the variable tension springs 56 lowers the height of the seating surface 40.

Figure 8:
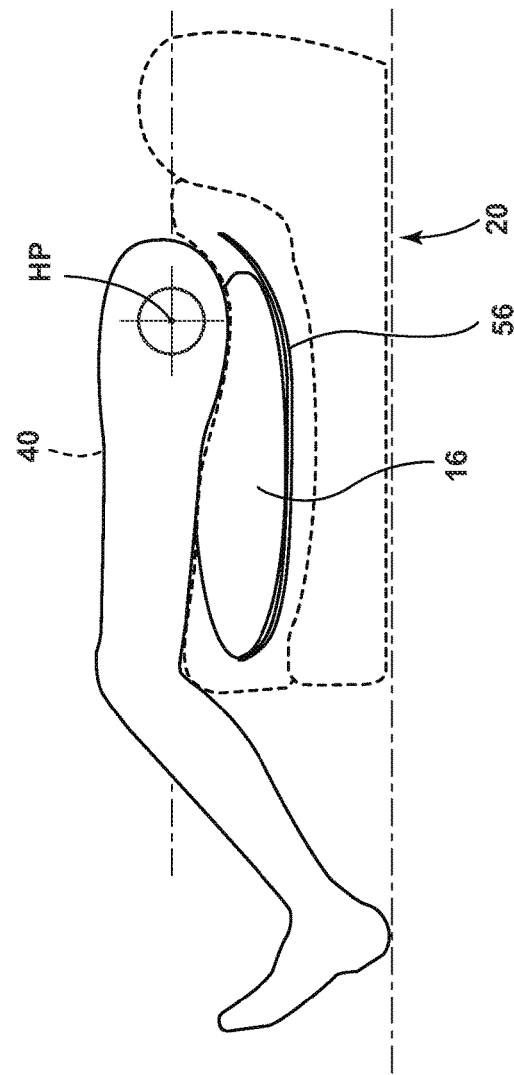
FIG. 8 is a schematic, cross-sectional view taken along line VIII-VIII of the vehicle seat of FIG. 3, illustrating an occupant's thighs seated on a firm seating surface.
Figure 9:
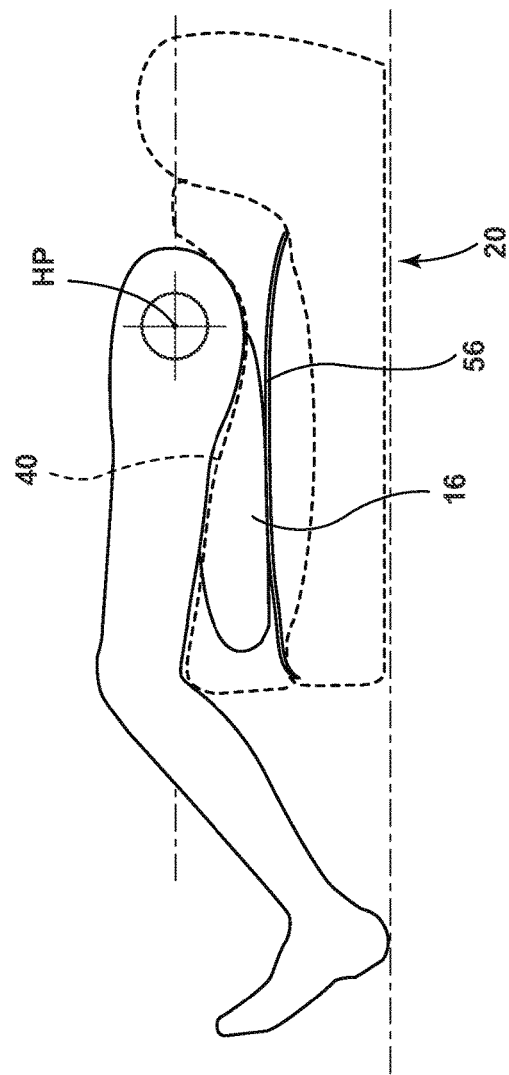
FIG. 9 is a schematic, cross-sectional side view taken along line IX-IX of the vehicle seat of FIG. 3, illustrating an occupant's thighs seated on a soft seating surface.

In operation, and as illustrated in FIGS. 8-9, the height and tension of the variable tension springs 56 can be adjusted to counteract a change in the height of the seating surface 40 caused by a selective increase or decrease in the pressure within the first bladder 16. As described above, deflating the first bladder 16 decreases the height of the first bladder 16, and therefore lowers the seating surface 40 and the location of the h-point HP. However, as shown in FIG. 9, the decrease in height of the first bladder 16 can be compensated for by raising the rear portion of the variable tension springs 56 and increasing the tension on the springs 56, effectively raising the height of the first bladder 16 when an occupant is seated on the seat 20. This enables the occupant to select a softer seat cushion 12a, yet maintain the overall height of the seating surface 40 and location of the h-point HP. As is easily understood, the opposite is true with respect to increasing the firmness of the cushion 12a. Referring to FIG. 8, when increasing the firmness of the cushion 12a, the first bladder 16 is selectively inflated, and the height and tension of the variable tensions springs 56 is reduced, effectively lowering the height of the first bladder 16 when an occupant is seated upon the seat 20. Additionally, the seat 20 may include a strain gauge 66 (FIG. 10) for measuring the tension in the variable tension springs 56, which may be used for automatically controlling the motor 58 and applied tension.

The seat back 22 may also have a similar adjustment mechanism, in the form of a back support assembly 68 that is adapted to adjust the position of the first bladder 50. Referring to the embodiment illustrated in FIG. 12, the back support assembly 68 and the first bladder 50 are arranged in a substantially vertical fore/aft relationship where the back support assembly 68 is positioned rearward of the first bladder 50. The back support assembly 68 includes at least two adjustable lumbar cables 70, at least two listing wires 72, and multiple seat springs 74. The adjustable lumbar cables 70 and listing wires 72 essentially form a frame structure within the upper seat frame 28, and the seat springs 74 are mounted therebetween. The back support assembly 68 also includes a pair of motors 76 coupled to the adjustable lumbar cables 70. The motors 76 are adapted to draw in a portion of the length of the adjustable lumbar cables 70, effectively shortening the cables 70, which results in less flexibility in the adjustable lumbar cables 70 and a stiffer back support assembly 68.

The back support assembly 68 can be utilized to counteract a change in the position of seat back cushion 12*b* caused by an increase or decrease in the pressure within the first bladder 50. For example, to obtain a softer seat back cushion 12*b*, the occupant can selectively deflate the first bladder 50, allowing the occupant's back to sink into the cushion 12*b* to a greater degree. Deflating the first bladder 50 decreases the thickness of the first bladder 50, and therefore also moves the support surface 54 and location of the h-point HP rearward. The decrease in the thickness of the first bladder 50 can be compensated for by stiffening the back support assembly 68. Decreasing the length of the adjustable lumbar cables 68 makes the back support assembly 68 less flexible, pushing the first bladder 50 forward and maintaining the location of the support surface 54. Stated differently, stiffening the back support assembly 68 compensates for the decrease in thickness of the first bladder 50. This enables the occupant to select a softer seat back cushion 12*b*, yet maintain the location of the support surface 54 and h-point HP. As is easily understood, the opposite is true with respect to increasing the firmness of the cushion 12*b*. When increasing the firmness of the cushion 12*b*, the first bladder 50 is selectively inflated, and the back support assembly 68 is automatically adjusted by increasing the length of the adjustable lumbar cables 70.

Figure 13:
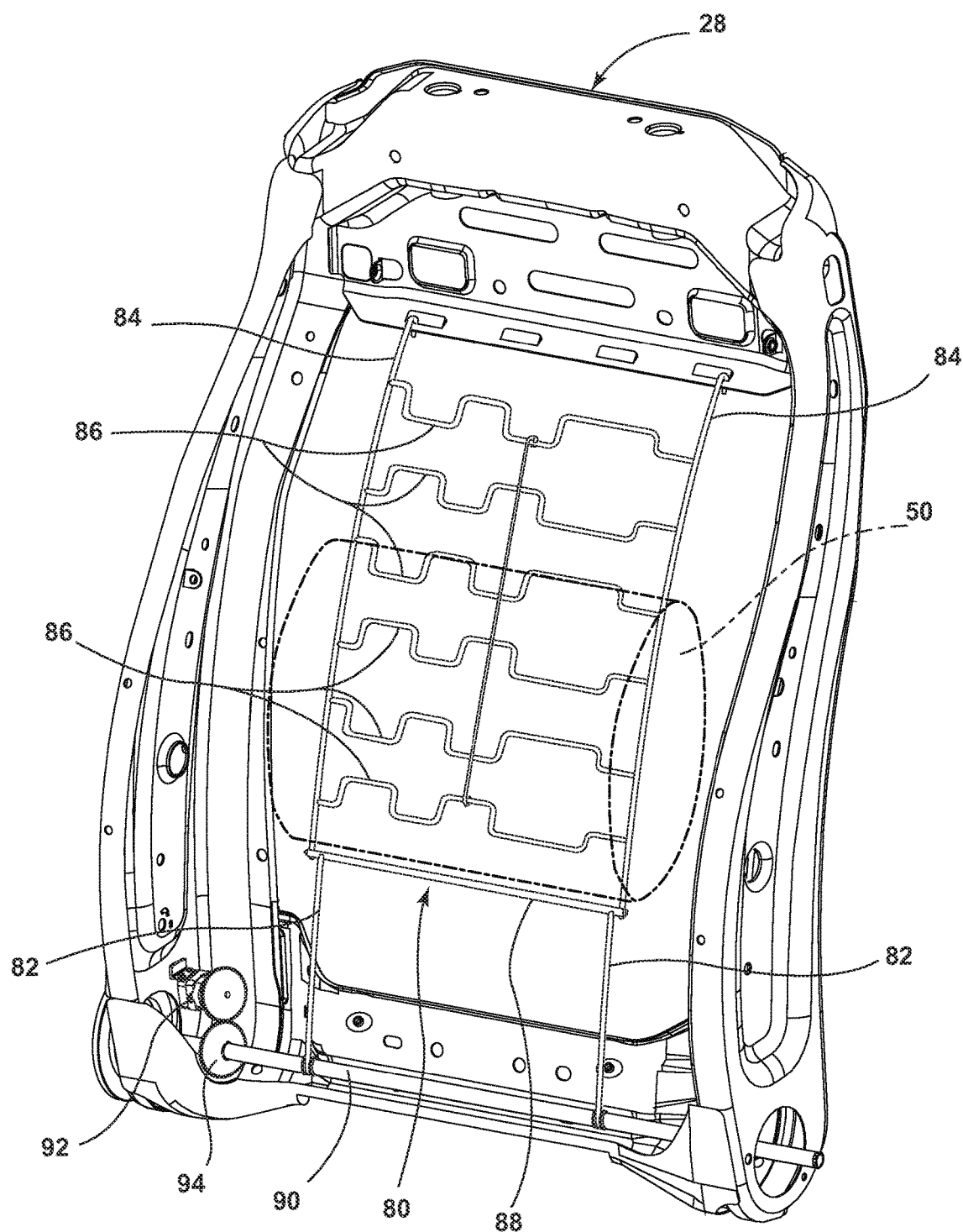
FIG. 13 is a bottom perspective view of an upper seat frame of the vehicle seat of FIG. 7, illustrating another embodiment of a back support assembly and adjustable bladder.

In yet another embodiment, the seat back 22 has an adjustment mechanism, in the form of a back support assembly 80, which is similar to the back support assembly 68 described above. Referring to the embodiment illustrated in FIG. 13, the back support assembly 80 includes two cables 82, at least two listing wires 84, multiple seat springs 86, and a listing post 88. The listing wires 72 are mounted between a top portion of the upper seat frame 28 and the substantially horizontal listing post 88, essentially forming a frame structure within which the seat springs 86 are disposed. The upper seat frame 28 includes a rotating tube 90 that extends between the lateral sides of the frame 28 and which is disposed at a lower portion thereof. The cables 82 are coupled to both the rotating tube 90, at their lower end, and to the listing post 88, at their upper end. The cables are held in tension between the rotating tube 90 and the listing post 88. The back support assembly 80 also includes a motor 92 and gear 94 which are operably coupled to the rotating tube 90 and positioned in a lower portion of the upper seat frame 28. The motor 92 and gear 94 are adapted to rotate the rotating tube 90, which winds the cables 82 around the rotating tube 90 and pulls the listing post 88 downward. This puts the listing wires 84 into greater tension, which decreases the flexibility of the back support assembly 89, resulting in stiffer back support. Stiffening the back support assembly 80 compensates for a decrease in thickness of the first bladder 50 as selectively adjusted by the occupant, in the same manner as described above relative to the prior embodiment.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A vehicle seat comprising:
   a cushion coupled to a seating member having an inflatable first bladder for adjusting a firmness of the cushion; and an inflatable second bladder separated from a support surface of the seating member by the first bladder, wherein the first bladder and second bladder are each coupled to a pump through respective first hoses and to one another through a separate second hose.

2. The vehicle seat of claim 1, wherein the first bladder and the second bladder are air bladders and air is used to increase and decrease the pressure therewithin.

3. The vehicle seat of claim 1, wherein the first bladder and the second bladder are liquid bladders and liquid is used to increase and decrease the pressure therewithin.

4. The vehicle seat of claim 1, wherein both the first and second bladders are enclosed within the cushion.

5. The vehicle seat of claim 1, wherein one of the first and second bladders is configured to sense the presence of a seated occupant.

6. A vehicle seat comprising:
a seating member having an inflatable first air bladder;
an inflatable second air bladder separated from a support surface by the first air bladder;
a first hose coupling the first bladder to the second bladder; and
a pair of second hoses separated from the first hose, the pair of second hoses coupled to the first and second air bladders and a control valve, wherein the control valve is configured to maintain a vehicle seat hip pivot point by counteracting a change in air pressure within the first air bladder with an inverse change within the second air bladder.

7. The vehicle seat of claim 6, wherein a top portion and a bottom portion of each respective bladder is substantially vertically aligned.

8. The vehicle seat of claim 7, wherein the first and second bladders directly contact and press against one another.

9. The vehicle seat of claim 6, wherein a layer of foam is disposed between the first and second air bladders.

10. The vehicle seat of claim 6, wherein the second air bladder is positioned rearward of the first air bladder, and the vehicle seat hip pivot point is maintained by increasing the air pressure within the second air bladder when the air pressure within the first air bladder is selectively decreased, and by decreasing the air pressure within the second air bladder when the air pressure within the first air bladder is selectively increased.

11. The vehicle seat of claim 6, wherein the first air bladder includes a first air line on a first end portion that is coupled to a pump and the hose on a second end portion that is fluidly coupled to the second air bladder.

12. The vehicle seat of claim 6, wherein a layer of foam is disposed between the first air bladder and a trim cover.

13. A seat assembly comprising:
a cushion including an inflatable first air bladder;
an inlet defined by the inflatable first air bladder for adjusting a firmness of the cushion; and
an adjustment mechanism including a lumbar cable separated from the inlet configured to adjust a distance between the first air bladder and a support surface by varying a cable length as an air pressure of the first air bladder is adjusted to maintain a constant h-point.

14. The seat assembly of claim 13, further comprising an air pump and at least one air line and control valve in fluid communication with the first air bladder for selectively adjusting the air pressure and controlling the firmness of the cushion.

* * * * *